(12) United States Patent
Isshiki

(10) Patent No.: US 9,548,861 B2
(45) Date of Patent: Jan. 17, 2017

(54) ENCRYPTED STATISTICAL PROCESSING SYSTEM, DEVICE, METHOD, AND PROGRAM

(75) Inventor: Toshiyuki Isshiki, Tokyo (JP)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 14/124,930

(22) PCT Filed: May 30, 2012

(86) PCT No.: PCT/JP2012/003550
§ 371 (c)(1),
(2), (4) Date: Dec. 9, 2013

(87) PCT Pub. No.: WO2012/169153
PCT Pub. Date: Dec. 13, 2012

(65) Prior Publication Data
US 2014/0115321 A1    Apr. 24, 2014

(30) Foreign Application Priority Data

Jun. 10, 2011 (JP) .................. 2011-130489

(51) Int. Cl.
*H04L 9/08* (2006.01)
*H04L 9/30* (2006.01)
(Continued)

(52) U.S. Cl.
CPC ............... *H04L 9/0861* (2013.01); *H04L 9/14* (2013.01); *H04L 9/30* (2013.01); *H04L 9/3073* (2013.01); *G06F 21/72* (2013.01); *H04L 2209/76* (2013.01)

(58) Field of Classification Search
CPC ............ H04L 9/006; H04L 9/008; H04L 9/08; H04L 9/0802; H04L 9/0805; H04L 9/0816; H04L 9/0819; H04L 9/0822; H04L 9/0825; H04L 9/0827; H04L 9/083; H04L 9/0833; H04L 9/0838; H04L 9/0861; H04L 9/0869; H04L 9/0877; H04L 9/14; H04L 9/28; H04L 9/30; H04L 9/3006; H04L 2209/76; H04L 63/0281; H04L 63/0428; H04L 63/0435; H04L 63/0422; H04L 63/045; H04L 63/0464; H04L 63/0471; H04L 63/0478; H04L 63/06; H04L 63/061; H04L 63/062; H04L 63/065; G06F 21/60; G06F 21/602; G06F 21/604; G06F 21/606; G06F 21/62; G06F 21/6209; G06F 21/6218; G06F 21/6272; G06F 21/72
See application file for complete search history.

(56) References Cited

U.S. PATENT DOCUMENTS 7,286,665 B1 * 10/2007 Wang ...................... H04L 9/002
                                                          380/282
7,356,688 B1 *  4/2008 Wang ................... H04L 9/3013
                                                          380/277
(Continued)

FOREIGN PATENT DOCUMENTS

| JP | H09-288658 A | 11/1997 |
| JP | 2007-215150  | 8/2007  |

(Continued)

OTHER PUBLICATIONS

Subramaniam et al., "Experimental Analysis of Privacy-Preserving Statistics Computation", In Proceedings of the Workshop on Secure Data Management, held in conjunction with VLDB '04, Aug. 30, 2004.*

(Continued)

*Primary Examiner* — Jung Kim
*Assistant Examiner* — Christopher Ruprecht
(74) *Attorney, Agent, or Firm* — Wilmer Cutler Pickering Hale and Dorr LLP

(57) ABSTRACT

A service provider device includes key generation means, which generates a service public key for encrypting data and a secret key, and proxy key generation means, which inputs the service public key and the secret key and generates a proxy key. A data registration device includes encrypted data generation means, which generates encrypted data upon input of the service public key and data, and stores the generated encrypted data in a database. Proxy devices each includes encrypted portion statistical data generation means, which generates encrypted portion statistical data upon input of the proxy key with respect to the encrypted data stored in the database. An integrated data generation device includes encrypted statistical data generation means, which inputs the encrypted portion statistical data from each of the proxy devices, generates encrypted statistical data, and stores the generated encrypted statistical data in an integrated data storage device.

6 Claims, 11 Drawing Sheets

(51) Int. Cl.
*G06F 21/72* (2013.01)
*H04L 9/14* (2006.01)

(56) References Cited

U.S. PATENT DOCUMENTS

| | | | | |
|---|---|---|---|---|
| 8,515,058 | B1* | 8/2013 | Gentry | H04L 9/008 380/28 |
| 2004/0025019 | A1* | 2/2004 | Watanabe | H04L 9/3013 713/168 |
| 2008/0059787 | A1* | 3/2008 | Hohenberger et al. | 713/153 |
| 2008/0170701 | A1* | 7/2008 | Matsuo | H04L 63/0442 380/281 |
| 2011/0154016 | A1* | 6/2011 | Niccolini et al. | 713/150 |
| 2011/0264920 | A1* | 10/2011 | Rieffel | H04L 9/008 713/189 |
| 2012/0204026 | A1* | 8/2012 | Shi | H04L 9/3006 713/155 |
| 2013/0339726 | A1* | 12/2013 | Yoshida | H04L 9/0825 713/153 |
| 2014/0050318 | A1* | 2/2014 | Hayashi | H04L 9/3073 380/46 |
| 2014/0161251 | A1* | 6/2014 | Yoshida | H04L 9/0825 380/44 |

FOREIGN PATENT DOCUMENTS

| | | |
|---|---|---|
| JP | 2008-109308 | 5/2008 |
| JP | 2010-166228 | 7/2010 |
| JP | WO 2011027189 A1 * 3/2011 | ........... H04L 9/3073 |

OTHER PUBLICATIONS

Castelluccia, C. et al., "Efficient and Provably Secure Aggregation of Encrypted Data in Wireless Sensor Networks", ACM Transactions on Sensor Networks, vol. 5, No. 3, Article 20, Publication date: May 2009. Copyright 2009 ACM.*
Isshiki, T. et al., "An FPGA Implementation of Homomorphic Enryption Schemes", Symposium on Cryptography and Information Security 2011, 6 pages.
International Search Report corresponding to PCT/JP2012/003550, dated Aug. 2, 2012, 3 pages.
Written Opinion of the International Search Authority corresponding to PCT/JP2012/003550, mailing date Aug. 14, 2012, 3 pages.
Japanese Office Action issued in corresponding Japanese Application No. 2013-519374, dated Apr. 19, 2016, 2 pages.
Sakuma, et al. "Privacy-Preserving Data Mining", Journal of Japanese Society for Artificial Intelligence 24(2), Mar. 1, 2009, pp. 283-294 (12 pages).

* cited by examiner

ENCRYPTED STATISTICAL PROCESSING SYSTEM, DEVICE, METHOD, AND PROGRAM

CROSS-REFERENCE TO RELATED APPLICATIONS

This application is a national stage application of International Application No. PCT/JP2012/003550 entitled "ENCRYPTED STATISTICAL PROCESSING SYSTEM, DEVICE, METHOD, AND PROGRAM," filed on May 30, 2012, which claims the benefit of the priority of Japanese patent application JP2011-130489, filed on Jun. 10, 2011, the disclosures of each of which are hereby incorporated by reference in their entirety.

TECHNICAL FIELD

The present invention relates to an encrypted statistical processing system, an encrypted statistical processing device, an encrypted statistical processing method, and an encrypted statistical processing program.

BACKGROUND ART

In recent years, the importance of security in cloud services has been widely recognized. A proposed service, for example, stores data encrypted by homomorphic encryption schemes in a database in a cloud network (hereinafter simply referred to as a cloud), performs statistical processing on encrypted data stored in the database without decrypting the encrypted data to generate encrypted data representative of the result of processing, and acquires as needed the encrypted data representative of the processing result to decrypt the encrypted data.

As a technology related to the above service, homomorphic encryption schemes is described, for instance, in Non-Patent Literature 1.

CITATION LIST

Non-Patent Literature

Non-Patent Literature 1: Toshiyuki Isshiki, Ken Obana, Sumio Morioka, and Kazue Sako, "FPGA Implementation of Homomorphic Encryption Schemes," Symposium on Cryptography and Information Security 2011 (SCIS 2011)

SUMMARY OF INVENTION

Technical Problem

A certain cloud service provider uses a database in a cloud to collect information supplied from a user, obtains statistical data from the collected information, and provides a service in accordance with the statistical data. An example of this type of service would be a recommendation service that provides the user with information about recommended products.

In the above instance, the information supplied from the user often includes personal information about the user, such as the information about purchases made by the user and the attributes of the user (age, gender, occupation, residence, etc.)

Meanwhile, it is often difficult for the user to recognize who manages a database in the cloud at what location and in what manner. Therefore, it is said that the user is worried about security. In other words, the user cannot rely on the administrator of the database in the cloud. Hence, information leakage prevention measures frequently adopted for the database in the cloud by using data access rights do not make sense.

As such being the case, the information supplied from the user may be encrypted in such a manner as to permit only a service provider to decrypt the supplied information so that database manager also cannot acquire the information about the user before being stored in the database in the cloud. However, it is generally known that it is difficult to obtain statistical data from the encrypted supplied information without decrypting it.

The homomorphic encryption schemes described in Non-Patent Document 1 makes it possible to perform statistical processing on plain text without using a secret key in a situation where a plurality of pieces of data encrypted by a certain public key remain encrypted. However, the plurality of pieces of encrypted data need to be encrypted by the same public key before being subjected to statistical processing. In other words, if the plurality of pieces of encrypted data to be statistically processed is encrypted by different public keys, the encrypted data cannot be statistically processed before being decrypted.

If the plurality of pieces of encrypted data to be statistically processed is encrypted by different public keys, for example, all the encrypted data to be statistically processed may be obtained, decrypted, and statistically processed. However, this method requires that all pieces of the encrypted data be downloaded to the service provider. Therefore, this method is not desirable from the viewpoint of convenience and communication cost. Further, it is conceivable that the service provider has a limited amount of computing resources in a cloud environment. Therefore, it is preferred that computations required for statistical processing be performed on the cloud side. Furthermore, as encrypted target data is decrypted once, it is necessary to prevent the leakage of data from a computer used by the service provider. Taking data leakage prevention measures requires a certain amount of cost.

The present invention has been made in view of the above circumstances and has an object to provide an encrypted statistical processing system, an encrypted statistical processing device, an encrypted statistical processing method, and an encrypted statistical processing program that perform statistical processing on data encrypted by different public keys while the data is left encrypted.

Solution to Problem

According to the present invention, there is provided an encrypted statistical processing system including a plurality of service provider devices, a data registration device, a database, a plurality of proxy devices, an integrated data generation device, and an integrated data storage device. The service provider devices each include key generation means, which generates a service public key for encrypting data and a secret key corresponding to the service public key, and proxy key generation means, which generates a proxy key upon input of the service public key and the secret key. The data registration device includes encrypted data generation means, which generates encrypted data upon input of the service public key and predetermined data. The database stores the encrypted data. The proxy devices each include encrypted portion statistical data generation means, which generates encrypted portion statistical data upon input of the proxy key generated by the proxy key generation means with respect to the encrypted data stored in the database. The integrated data generation device includes encrypted statistical data generation means, which inputs the encrypted portion statistical data from each of the proxy devices and generates encrypted statistical data. The integrated data storage device stores the encrypted statistical data.

According to the present invention, there is provided an encrypted statistical processing device including key generation means, proxy key generation means, encrypted data generation means, encrypted portion statistical data generation means, and encrypted statistical data generation means. The key generation means generates a service public key for encrypting data and a secret key corresponding to the service public key. The proxy key generation means generates a proxy key upon input of the service public key and the secret key. The encrypted data generation means generates encrypted data upon input of the service public key and predetermined data. The encrypted portion statistical data generation means generates encrypted portion statistical data with respect to the encrypted data upon input of the proxy key generated by the proxy key generation means. The encrypted statistical data generation means generates encrypted statistical data in accordance with the encrypted portion statistical data.

According to the present invention, there is provided an encrypted statistical processing method including the steps of: generating a service public key for encrypting data and a secret key corresponding to the service public key; generating a proxy key upon input of the service public key and the secret key; generating encrypted portion statistical data upon input of the proxy key with respect to encrypted data generated upon input of the service public key and predetermined data; and generating encrypted statistical data in accordance with the encrypted portion statistical data.

According to the present invention, there is provided an encrypted statistical processing program that causes a computer to perform: a key generation process of generating a service public key for encrypting data and a secret key corresponding to the service public key; a proxy key generation process of generating a proxy key upon input of the service public key and the secret key; an encrypted data generation process of generating encrypted data upon input of the service public key and predetermined data; an encrypted portion statistical data generation process of generating encrypted portion statistical data with respect to the encrypted data upon input of the proxy key generated by proxy key generation process; and an encrypted statistical data generation process of generating encrypted statistical data in accordance with the encrypted portion statistical data.

Advantageous Effects of the Invention

The present invention makes it possible to perform statistical processing on data encrypted by different public keys while the data is left encrypted.

DESCRIPTION OF EMBODIMENTS

Figure 1:
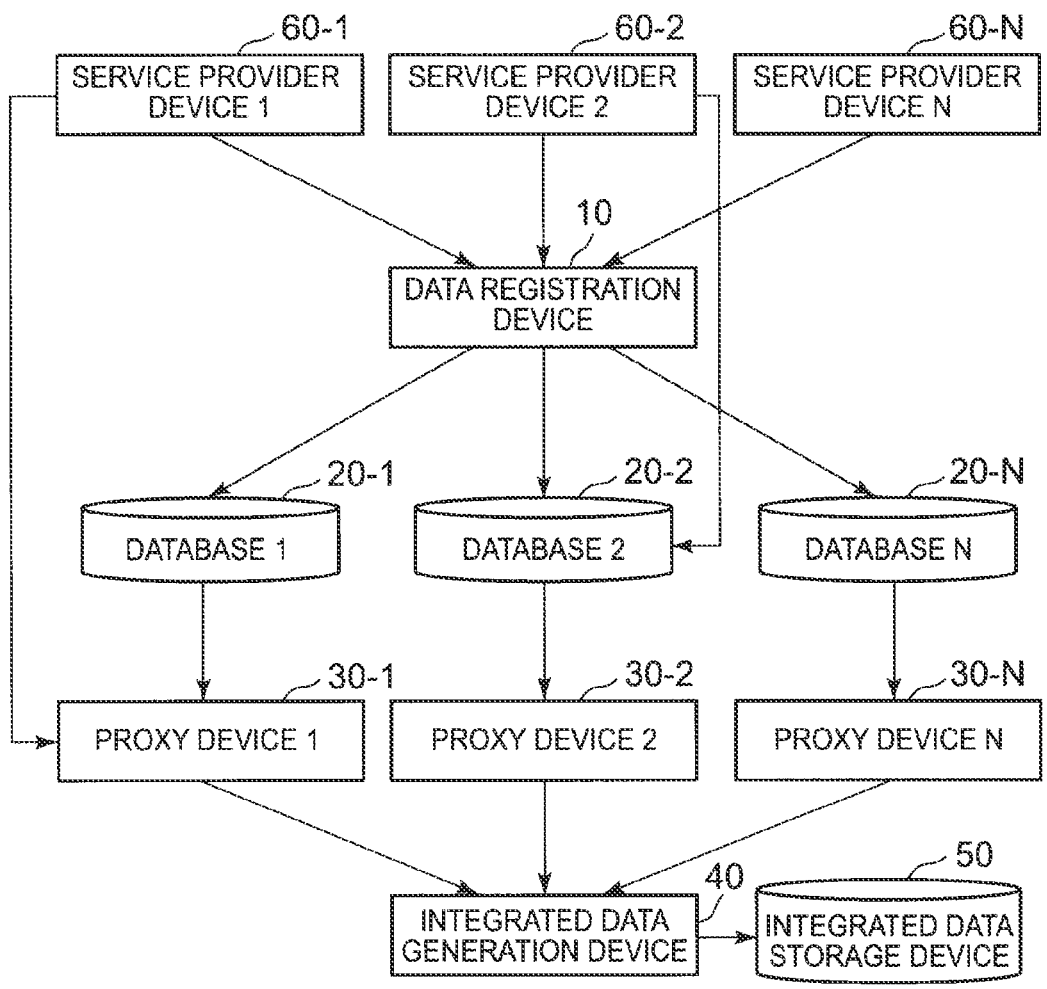
FIG. 1 It depicts a block diagram showing an exemplary configuration of an encrypted statistical processing system according to the present invention.

An exemplary embodiment of the present invention will now be described with reference to the accompanying drawings. FIG. 1 is a block diagram showing an exemplary configuration of an encrypted statistical processing system according to the present invention. As shown in FIG. 1, the encrypted statistical processing system includes a data registration device 10 for registering encrypted data, one or more databases 20-1, 20-2, . . . , 20-N for storing the encrypted data, one or more service provider devices 60-$i$, one or more proxy devices 30-$i$, an integrated data generation device 40, and an integrated data storage device 50. The above devices are mutually connected through a communication network such as a LAN or the Internet.

The databases 20-1, 20-2, . . . , 20-N are stored in a storage device (not shown) such as an optical disk drive or a magnetic disk drive. The individual databases may be stored in different storage devices or a plurality of databases may be stored in one storage device. The following description indicates that data is stored in a database. In reality, however, the data is included in a database stored in the storage device.

The service provider devices 60-$i$ generate a public key pk_i for generating encrypted data and a secret key sk_i corresponding to the public key pk_i. The service provider devices 60-$i$ also generate a proxy key that generates encrypted portion statistical data from the encrypted data stored in the databases 20-$i$. Further, the service provider devices 60-$i$ decrypt encrypted statistical data to generate statistical data.

The proxy key converts encrypted data, which is encrypted by a predetermined public key, to encrypted data that can be decrypted by a secret key corresponding to a public key different from the predetermined public key.

The encrypted portion statistical data is obtained when statistical data derived from a set of plain text corresponding to a set of encrypted data generated by a predetermined public key is encrypted by a predetermined public key.

In the present exemplary embodiment, it is assumed that a plurality of databases exist. It is also assumed for the sake of brevity that only one unique public key is used for each database to encrypt data. More specifically, data encrypted by public key 1 is stored in database 1 and data encrypted by public key 2 is stored in database 2.

In a later-described example, database 1 stores data $E(pk\_1, M\_1)$ to $E(pk\_1, M\_n)$ and database 2 stores data $E(pk\_2, M'\ 1)$ to $E(pk\_2, M'\ n')$. It is assumed that M is statistical data obtained from $M\_1, \ldots,$ and $M\_n$. If, for example, $M=(M\_1+ \ldots +M\_n)$, M is the sum of $M\_1, \ldots,$ and $M\_n$. If a homomorphic code used in the present exemplary embodiment is E, $E(pk\_1, M)$ can be computed without decrypting the encrypted data. In the present exemplary embodiment, $E(pk\_1, M)$ is referred to as the encrypted portion statistical data of database 1.

The proxy devices 30-$i$ generate encrypted portion statistical data upon input of encrypted data stored in a database 20-$i$ and the proxy key.

The integrated data generation device 40 generates encrypted statistical data upon input of one or more pieces of encrypted portion statistical data. The integrated data storage device 50 stores the encrypted statistical data. The encrypted statistical data is encrypted data derived from statistical processing that is performed in accordance with the encrypted portion statistical data.

Figure 2:
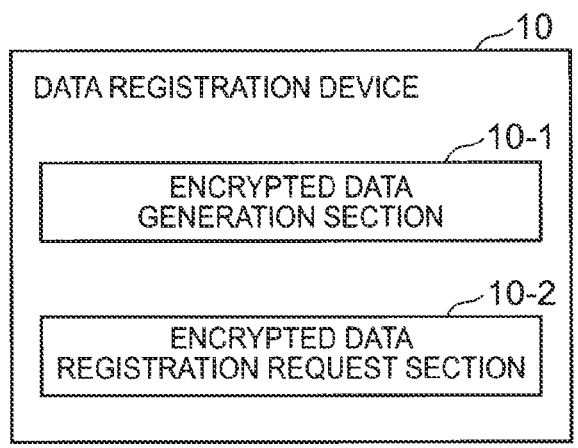
FIG. 2 It depicts a block diagram showing an exemplary configuration of a data registration device.

The data registration device 10 is implemented specifically by a personal computer or other information processing device that operates in accordance with a program. FIG. 2 is a block diagram showing an exemplary configuration of the data registration device. As shown in FIG. 2, the data registration device 10 includes an encrypted data generation section 10-1 and an encrypted data registration request section 10-2.

The encrypted data generation section 10-1 is capable of generating encrypted data of data M by using the public key pk_i upon input of the public key pk_i generated by a service provider device 60-$i$ and the data M to be registered. The encrypted data generation section 10-1 is implemented specifically by a CPU of an information processing device that performs processing in accordance with a program.

The encrypted data registration request section 10-2 is capable of requesting that the generated encrypted data be registered in a database 20-$i$. The encrypted data generation section 10-1 is implemented specifically by a CPU and a network interface section of an information processing device that performs processing in accordance with a program.

Figure 3:
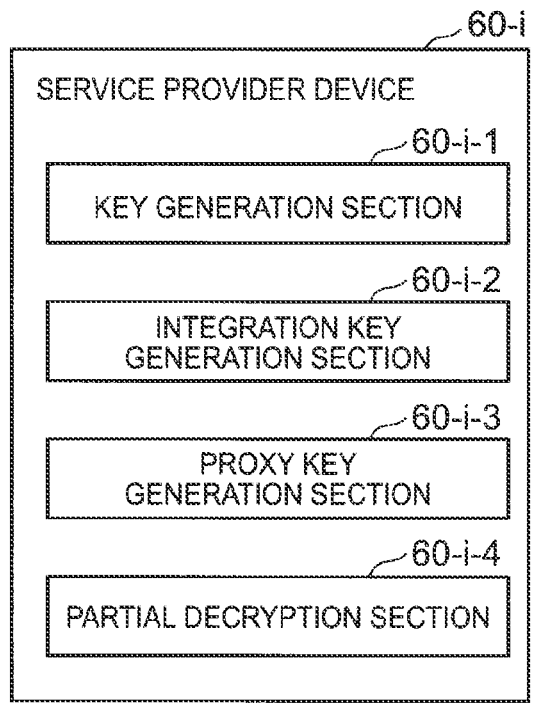
FIG. 3 It depicts a block diagram showing an exemplary configuration of a service provider device.

The service provider devices 60-$i$ are implemented specifically by a personal computer or other information processing device that operates in accordance with a program. FIG. 3 is a block diagram showing an exemplary configuration of a service provider device. As shown in FIG. 3, the service provider devices 60-$i$ each include a key generation section 60-$i$-1, an integration key generation section 60-$i$-2, a proxy key generation section 60-$i$-3, and a partial decryption section 60-$i$-4.

The key generation section 60-$i$-1 is capable of generating the public key pk_i and the secret key sk_i corresponding to the public key pk_i. The key generation section 60-$i$-1 is implemented specifically by a CPU of an information processing device that performs processing in accordance with a program.

The integration key generation section 60-$i$-2 is capable of generating a global public key gpk for generating a proxy key rk_i by interacting with one or more remote service provider devices 60-$j$ (more specifically, performing processing by intercommunicating with one or more remote service provider devices 60-$j$; details will be described later) upon input of the secret key sk_i. The integration key generation section 60-$i$-2 is implemented specifically by a CPU of an information processing device that performs processing in accordance with a program.

The proxy key generation section 60-$i$-3 is capable of generating a proxy key rk_i, which converts data encrypted by the public key pk_i to the encrypted portion statistical data, upon input of the global public key gpk and the secret key sk_i. The proxy key generation section 60-$i$-3 is implemented specifically by a CPU of an information processing device that performs processing in accordance with a program.

The partial decryption section 60-$i$-4 is capable of partially decrypting the encrypted statistical data. The partial decryption section 60-$i$-4 is implemented specifically by a CPU of an information processing device that performs processing in accordance with a program.

Figure 4:
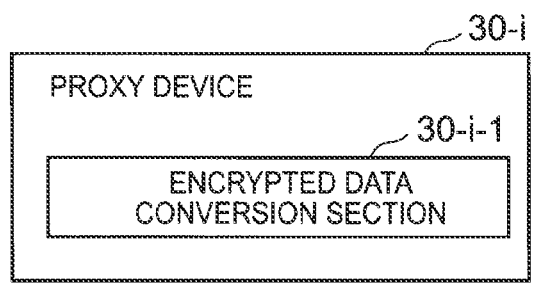
FIG. 4 It depicts a block diagram showing an exemplary configuration of a proxy device.

The proxy devices 30-$i$ are implemented specifically by a personal computer or other information processing device that operates in accordance with a program. FIG. 4 is a block diagram showing an exemplary configuration of a proxy device. As shown in FIG. 4, the proxy devices 30-$i$ each include an encrypted data conversion section 30-$i$-1 that receives data encrypted with a proxy key rk_i and the public key pk_i and generates the encrypted portion statistical data. The encrypted data conversion section 30-$i$-1 is implemented specifically by a CPU of an information processing device that performs processing in accordance with a program.

Figure 5:
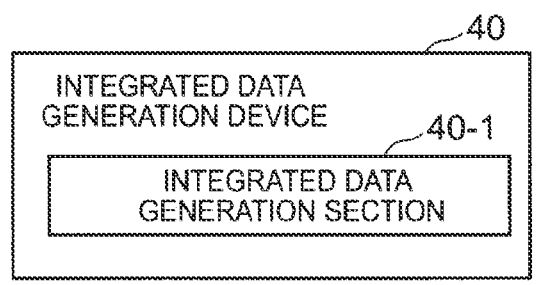
FIG. 5 It depicts a block diagram showing an exemplary configuration of an integrated data generation device.

The integrated data generation device 40 is implemented specifically by a personal computer or other information processing device that operates in accordance with a program. FIG. 5 is a block diagram showing an exemplary configuration of the integrated data generation device. As shown in FIG. 5, the integrated data generation device 40 includes a statistical processing section 40-1 that receives the encrypted portion statistical data from the proxy devices 30-1 to 30-N, respectively, and generates the encrypted statistical data. The statistical processing section 40-1 is implemented specifically by a CPU of an information processing device that performs processing in accordance with a program.

In the present exemplary embodiment, the encrypted statistical processing system includes a plurality of devices. Alternatively, however, the encrypted statistical processing system may be implemented by one information processing device that incorporates the functionality of each of the plurality of devices. Even when the encrypted statistical processing system is implemented by one information processing device, it is assumed that services are provided by different public key.

The encrypted statistical processing system according to the present exemplary embodiment performs a service provider key generation process, a data registration process, a proxy key generation process, a statistical information computation process, and a decryption process. Steps performed in each of these processes will be described in detail below.

Figure 6:
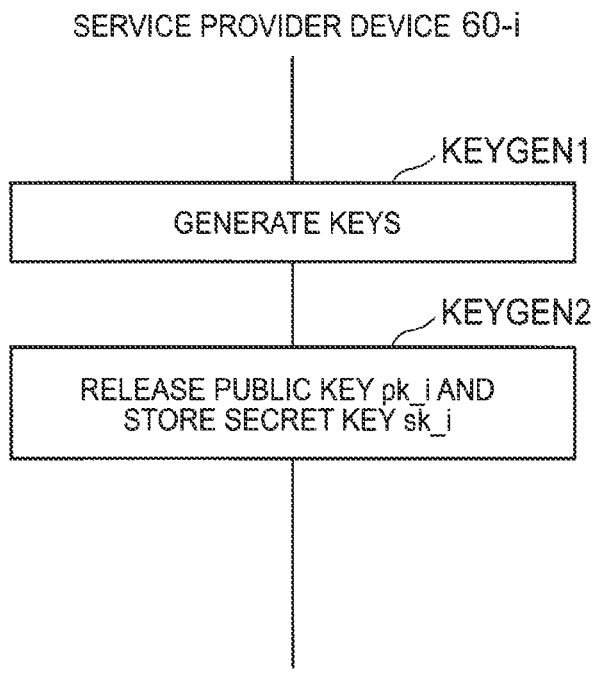
FIG. 6 It depicts a flowchart showing an example of a service provider key generation process.

The service provider key generation process will now be described. FIG. 6 is a flowchart showing an example of the service provider key generation process.

As shown in FIG. 6, a service provider device 60-$i$ (e.g., key generation section 60-$i$-1) generates the public key pk_$i$ and the secret key sk_$i$ upon input of a system parameter (step KEYGEN1 of FIG. 6).

Next, the service provider device 60-$i$ (e.g., key generation section 60-$i$-1) releases the public key pk_$i$ and stores the secret key sk_$i$ (step KEYGEN2 of FIG. 6). Storing the secret key sk_$i$ is achieved by storing the secret key sk_$i$ in a storage section.

Figure 7:
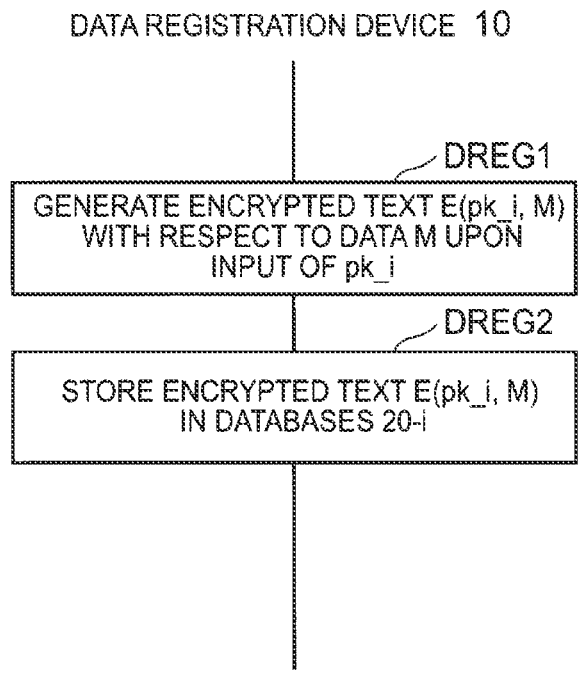
FIG. 7 It depicts a flowchart showing an example of a data registration process.

The data registration process will now be described. FIG. 7 is a flowchart showing an example of the data registration process.

As shown in FIG. 7, the data registration device 10 (e.g., encrypted data generation section 10-1) generates encrypted text E(pk_$i$, M) upon input of the public key pk_$i$ and the data M to be registered (step DREG1 of FIG. 7).

Next, the data registration device 10 (e.g., encrypted data registration request section 10-2) transmits the encrypted text E(pk_$i$, M) to a database 20-$i$ for storage purposes (step DREG2 of FIG. 7).

Figure 8:
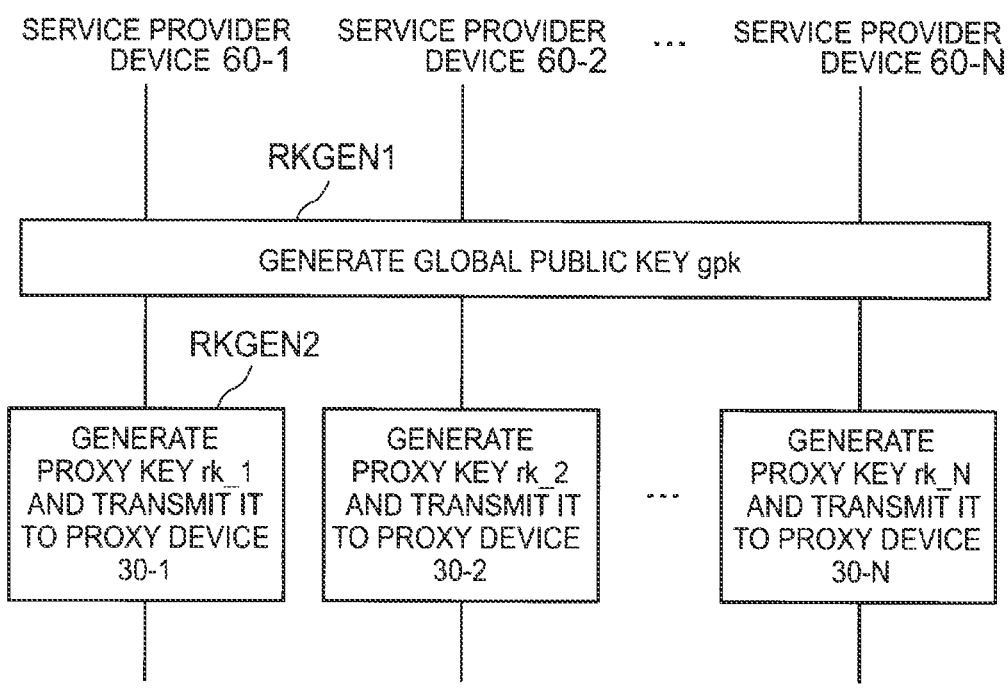
FIG. 8 It depicts a flowchart showing an example of a proxy key generation process.

The proxy key generation process will now be described. FIG. 8 is a flowchart showing an example of the proxy key generation process.

As shown in FIG. 8, the service provider devices 60-1 to 60-N (e.g., integration key generation sections 60-$i$-2) interactively generate the global public key gpk upon input of public keys pk_1 to pk_N and secret keys sk_1 to sk_N (step RKGEN1 of FIG. 8).

Next, upon input of the global public key gpk and the secret key pk_$i$, the service provider devices 60-$i$ (e.g., proxy key generation sections 60-$i$-3) generate proxy keys rk_$i$ and transmit the generated proxy keys rk_$i$ to the proxy devices 30-$i$ (step RKGEN2 of FIG. 8).

Figure 9:
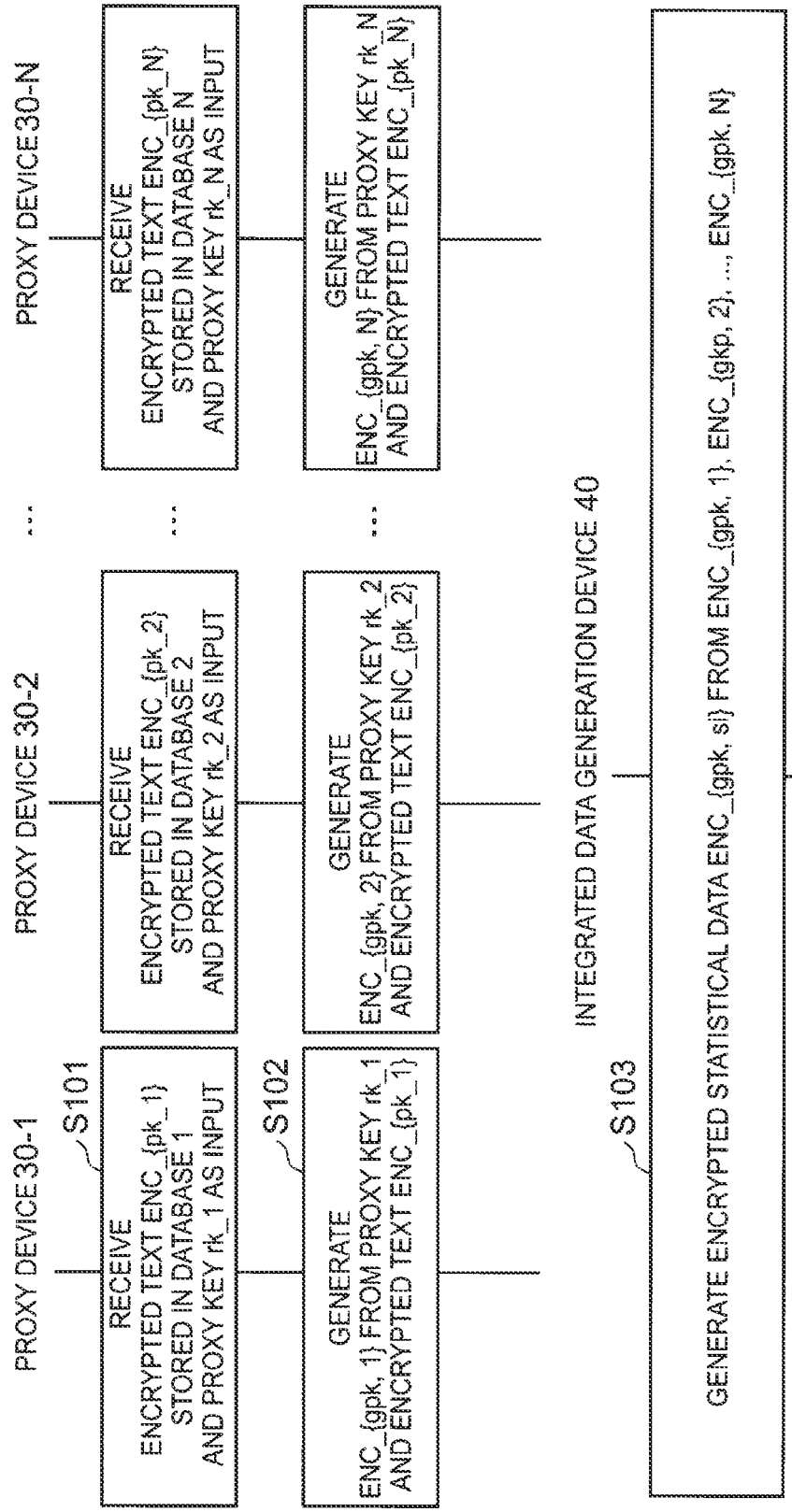
FIG. 9 It depicts a flowchart showing an example of a statistical information computation process.

The statistical information computation process will now be described. FIG. 9 is a flowchart showing an example of the statistical information computation process.

As shown in FIG. 9, the proxy devices 30-$i$ input the proxy keys rk_$i$ and sets of encrypted text {E(pk_1, M)} stored in the databases i (step S101 of FIG. 9).

Next, the proxy devices 30-$i$ (e.g., encrypted data conversion sections 30-$i$-1) generate encrypted portion statistical data E(gpk, M_$i$) from the proxy keys rk_$i$ and the sets of encrypted text {E(pk_1, M)}, and transmit the generated encrypted portion statistical data E(gpk, M_$i$) to the integrated data generation device 40 (step S102 of FIG. 9).

In the above instance, M_$i$ is a variable representing the result of statistical processing performed on the whole plain text of the sets of encrypted text {E(pk_1, M)} stored in the databases i.

Upon receipt of the encrypted portion statistical data E(gpk, M_1) to E(gpk, M_N) from the proxy devices 30-1 to 30-N, the integrated data generation device 40 (e.g., integrated data generation section 40-1) generates the encrypted statistical data E(gpk, si) (step S103 of FIG. 9). In this instance, si represents the result of statistical processing performed on M_1 to M_N.

Figure 10:
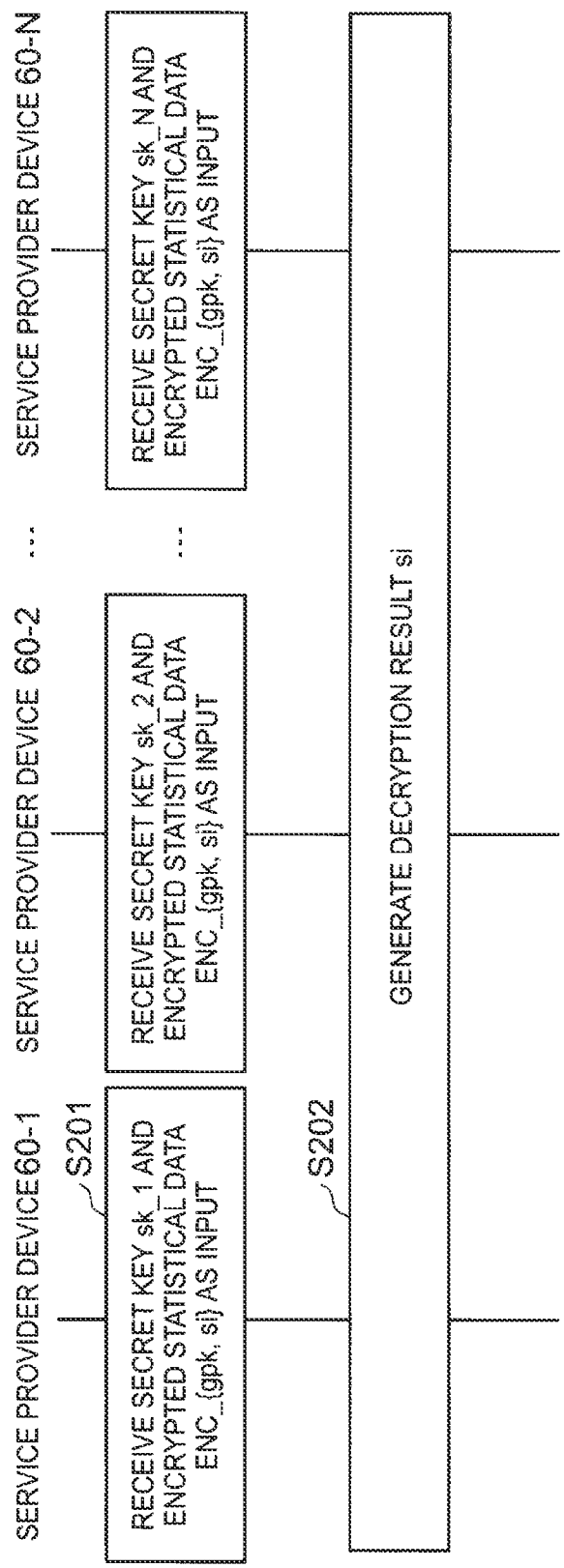
FIG. 10 It depicts a flowchart showing an example of a decryption process.

The decryption process will now be described. FIG. 10 is a flowchart showing an example of the decryption process.

As shown in FIG. 10, the service provider devices 60-1 to 60-N input the secret key sk_1 and the encrypted statistical data E(gpk, si) (step S201 of FIG. 10).

Next, the service provider devices 60-1 to 60-N (e.g., partial decryption sections 60-$i$-4) interactively generate a decryption result si from the secret key sk_N and the encrypted statistical data E(gpk, si) (step S202 of FIG. 10).

Operations of the present exemplary embodiment will now be described. It should be noted that $a^{\{b\}}$ stands for the bth power of a. It should also be noted that a_$i$ is a symbol obtained by attaching the subscript i to a.

First of all, a pairing function will be described. When G and G_T are cyclic groups having the order q, and g_1 and g_2 are generators of G, the pairing function e:G×G→G_T is a 2-input 1-output function that satisfies the following equations with respect to members a and b of arbitrary Z_q:

· $e(g\_1\hat{\;}a, g\_2\hat{\;}b) = e(g\_1, g\_2)\hat{\;}\{ab\}$

· $e(g\_1, g\_2) \neq 1$

A proxy re-encryption method described in Reference A (G. Ateniese, K. Fu, M. Green, and S. Hohenberger, "Improved Proxy Re-Encryption Schemes with Applications to Secure Distributed Storage," ACM Transactions on Information and System Security (TISSEC), 2006) will be described.

The proxy re-encryption method is a method of converting text encrypted by a public key pk_A to encrypted text decryptable by a secret key sk_B by using a key called a proxy key rk_{A→B} and without using sk_A.

The proxy re-encryption method includes five different algorithms, namely, a key generation algorithm, a proxy key generation algorithm, an encryption algorithm, a re-encryption algorithm, and a decryption algorithm. Each of these algorithms is described below.

(Key Generation)

A generator g of system parameters q, e, G and Z=e(g, g) are received as an input. The secret key sk_a=a of user A is randomly selected from Z_{q}. Z_{q} denotes a cyclic group having the order q.

Next, the public key pk_a=y_a=$g^{\{a\}}$ of user A is computed. Similarly, the public key pk_b=y_b=$g\hat{\;}b$ is computed by user B and released.

(Proxy Key Generation)

A sequence of operations performed to generate a key for converting data encrypted by the public key pk_A of user A to encrypted data decryptable by the secret key sk_B of user B is described below.

The public key pk_B of user B and the secret key sk_A of user A are received as an input.

Next, the proxy key rk_{A→B}=$y\_b^{\{1/a\}}$=$g^{\{b/a\}}$ is computed.

(Encryption)

A sequence of operations performed to encrypt a message M by the public key pk_A of user A is described below.

A random number r is selected from Z_q.

Next, (C_1, C_2)=($y\_a^{\{r\}}$, $Z^{\{M\}} \cdot Z^{\{r\}}$) is computed.

(Re-Encryption)

A sequence of operations performed to convert encrypted data (C_1, C_2) generated by the public key pk_A of user A for the purpose of generating encrypted data (C'_1, C'_2) decryptable by the secret key sk_B of user B is described below.

Encrypted data (C_1, C_2) generated by the public key pk_A of user A and the proxy key rk_{A→B} are received as an input.

Next, (C'_1, C'_2)=(e(C_1, rk_{A→B}), C_2)=(e($g^{\{ar\}}$, $g^{\{b/a\}}$), $Z^{\{m\}} \cdot Z^{\{r\}}$)=(e(g, g) $\hat{\;}\{br\}$, $Z^{\{M\}} \cdot Z^{\{r\}}$)=($Z^{\{br\}}$, $Z^{\{M\}} \cdot Z^{\{r\}}$) is computed.

(Decryption)

A sequence of operations performed to decrypt (C'_1, C'_2), which is generated as described above (Re-encryption), by the secret key sk_B of user B is described below.

First of all, $C'\_1^{\{1/b\}}=Z^{\{r\}}$ is computed.

Next, $C'\_2/Z^{\{r\}}=Z^{\{M\}}$ is computed.

Next, M is searched for from $Z^{\{M\}}$.

The proxy re-encryption method described in Reference A can perform addition on plain text without decrypting encrypted text no matter whether it is encrypted text (C_1, C_2) derived from encryption or encrypted text (C'_1, C'_2) derived from re-encryption.

Let us now assume that $(C\_1, C\_2)=(y\_a^{\{r\_1\}}, Z^{\{M\_1\}} \cdot Z^{\{r\_1\}})$ and that $(C\_3, C\_4)=(y\_a^{\{r\_2\}}, Z^{\{M\_2\}} \cdot Z^{\{r\_2\}})$.

In this instance, $(C\_5, C\_6)=(C\_1 \cdot C\_3, C\_2 \cdot C\_4)=(y\_a^{\{r\_1+r\_2\}}, Z^{\{M\_1+M\_2\}} \cdot Z^{\{r\_1+r\_2\}})$. Thus, (C_5, C_6) is the encrypted text of M_1+M_2. This encrypted text can be decrypted by the secret key sk_A of user A.

Let us further assume that $(C'\_1, C'\_2)=(Z^{\{b \cdot r\_1\}}, Z^{\{M\_1\}} \cdot Z^{\{r\_1\}})$ and that $(C'\_3, C'\_4)=(Z^{\{b \cdot r\_2\}}, Z^{\{M\_2\}} \cdot Z^{\{r\_2\}})$.

In this instance, $(C'\_5, C'\_6)=(C'\_1 \cdot C'\_3, C'\_2 \cdot C'\_4)=(Z^{\{b(r\_1+r\_2)\}}, Z^{\{M\_1+M\_2\}} \cdot Z^{\{r\_1+r\_2\}})$. Thus, (C_5, C_6) is the encrypted text of M_1+M_2. This encrypted text can be decrypted by the secret key sk_B of user B.

A sequence of processing steps performed by the encrypted statistical processing system according to the present exemplary embodiment will now be described in detail. The encrypted statistical processing system according to the present exemplary embodiment performs the service provider key generation process, the data registration process, the proxy key generation process, the statistical information computation process, and the decryption process.

In the example presented below, a method of computing the sum of encrypted data without decrypting it is described as the statistical information computation process. An infinite product, an average, and a variance can also be computed in the same sequence as the sum. Any integer number of service provider devices (one or more service provider devices) may exist. For the sake of brevity of explanation, however, the following description will be given on the assumption that three service provider devices exist. Steps performed in each of the above-mentioned processes will be described below.

Figure 11:
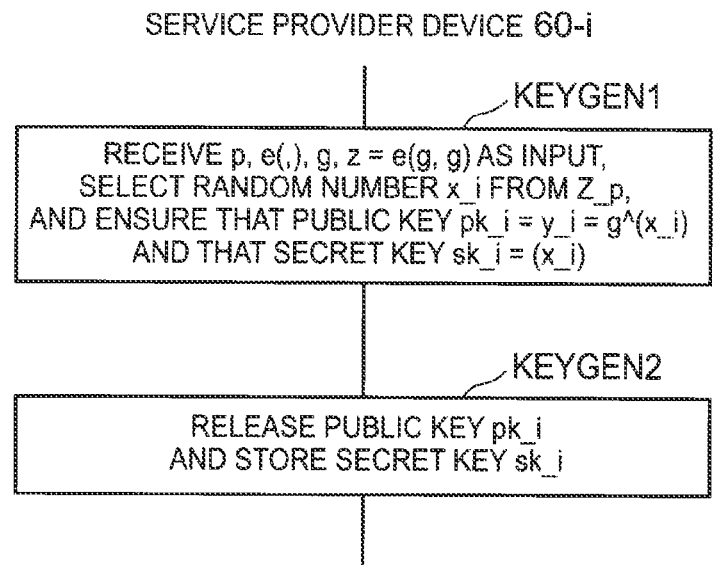
FIG. 11 It depicts a flowchart showing an example of the service provider key generation process.

First of all, the service provider key generation process will be described. FIG. 11 is a flowchart showing an example of the service provider key generation process.

As shown in FIG. 11, the service provider devices 60-i generate the public key $pk\_i=y\_i=g^{\{x\_i\}}$ and the secret key sk_i=x_i upon input of system parameters (q, e, g, Z) (step KEYGEN1 of FIG. 11).

Next, the service provider devices 60-i release the public key pk_i and store the secret key sk_i (step KEYGEN2 of FIG. 11).

Steps KEYGEN1 and KEYGEN2 are independently performed by the service provider devices 60-1, 60-2, 60-3.

Figure 12:
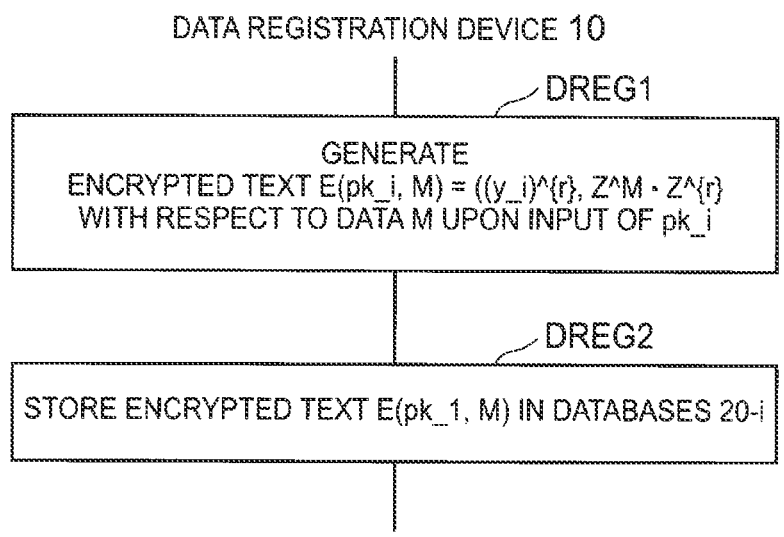
FIG. 12 It depicts a flowchart showing an example of the data registration process.

Next, the data registration process will be described. FIG. 12 is a flowchart showing an example of the data registration process.

As shown in FIG. 12, upon input of the public key pk_i and the data M to be registered, the data registration device 10 performs an encryption process by the method described in Reference A to generate encrypted text $E(pk\_i, M)=(y\_i^{\{r\}}, Z^M \cdot Z^{\{r\}})$ (step DREG1).

Next, the data registration device 10 transmits the encrypted text E(pk_i, M) to the databases 20-i for storage purposes (step DREG2). It is now assumed that one or more pieces of data encrypted by the public keys pk_1, pk_2, pk_3 are stored in the databases 20-1, 20-2, 20-3, respectively.

Figure 13:
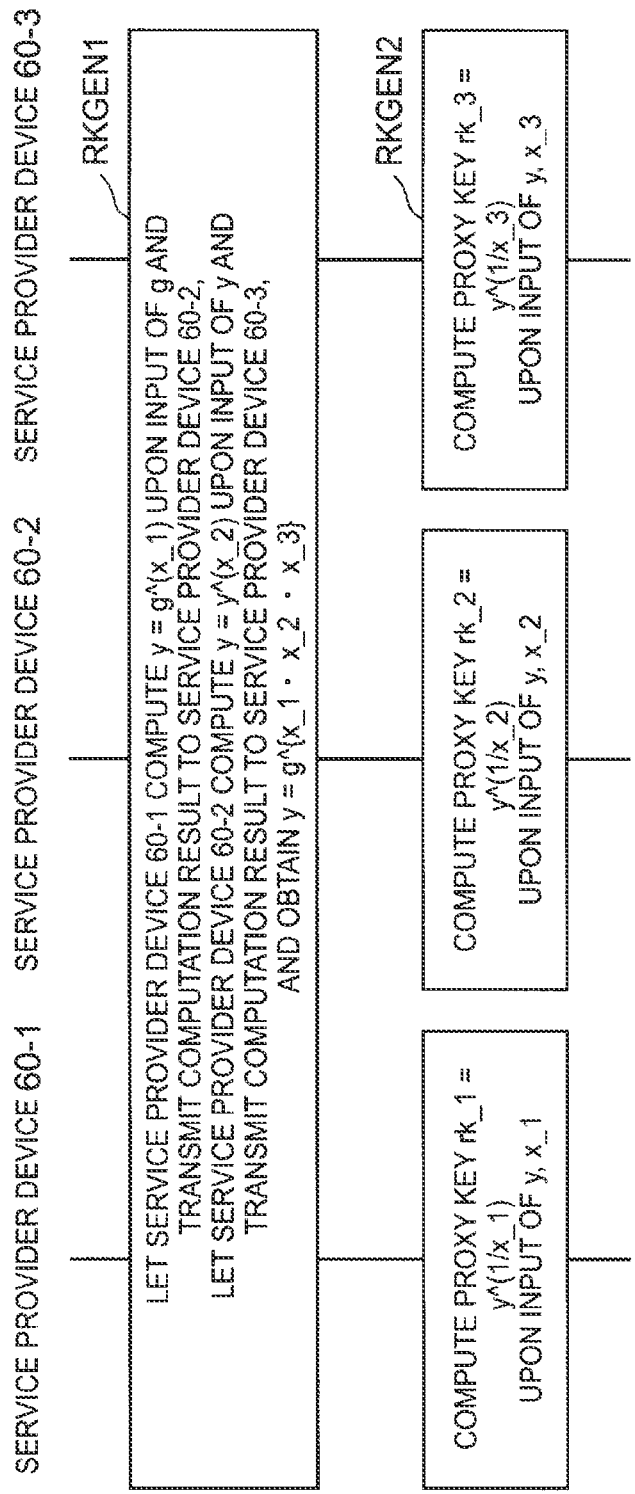
FIG. 13 It depicts a flowchart showing an example of the proxy key generation process.

Next, the proxy key generation process will be described. FIG. 13 is a flowchart showing an example of the proxy key generation process.

As shown in FIG. 13, the service provider devices 60-1 to 60-3 interactively generate the global public keys $gpk=g^{\{x\_1 \cdot x\_2 \cdot x\_3\}}$, respectively, upon input of the public keys pk_1 to pk_3 and the secret keys sk_1 to sk_3 (step RKGEN1). The term "interactively" means that the service provider devices 60-1 to 60-3, in the order named, perform the following process.

The service provider device 60-1 computes $gpk=g^{\{x\_1\}}$ and transmits the result of the computation to the service provider device 60-2.

Next, the service provider device 60-2 computes $gpk=gpk^{\{x\_2\}}=g^{\{x\_1 \cdot x\_2\}}$ and transmits the result of the computation to the service provider device 60-3.

Next, the service provider device 60-3 computes $gpk=gpk^{\{x\_3\}}=g^{\{x\_1 \cdot x\_2 \cdot x\_3\}}$ and releases gpk.

The following alternative process may be performed to provide increased safety.

The service provider device 60-1 computes $gpk=g^{\{r\_1 x\_1\}}$ and transmits the result of the computation to the service provider device 60-2.

Next, the service provider device 60-2 computes $gpk=gpk^{\{r\_2 x\_2\}}=g^{\{r\_1 x\_1 \cdot r\_2 x\_2\}}$ and transmits the result of the computation to the service provider device 60-3.

Next, the service provider device 60-3 computes $gpk=gpk^{\{r\_3 x\_3\}}=g^{\{r\_1 x\_1 \cdot r\_2 x\_2 \cdot r\_3 x\_3\}}$ and transmits the result of the computation to the service provider device 60-1.

Next, the service provider device 60-1 computes $gpk=gpk^{\{1/r\_1\}}=g^{\{x\_1 \cdot r\_2 x\_2 \cdot r\_3 x\_3\}}$ and transmits the result of the computation to the service provider device 60-2.

Next, the service provider device 60-2 computes $gpk=gpk^{\{1/r\_2\}}=g^{\{x\_1 \cdot x\_2 \cdot r\_3 x\_3\}}$ and transmits the result of the computation to the service provider device 60-3.

Next, the service provider device 60-3 computes $gpk=gpk^{\{1/r\_3\}}=g^{\{x\_1 \cdot x\_2 \cdot x\_3\}}$ and releases gpk.

Subsequently, after the global public key gpk is generated, the service provider devices 60-i compute $rk\_\{i\}=gpk^{\{1/x\_i\}}$ upon input of gpk and the secret key sk_i and generate the proxy keys. More specifically, the service provider devices 60-i compute $rk\_\{1\}=g^{\{x\_2 \cdot x\_3\}}$, $rk\_\{2\}=g^{\{x\_1 \cdot x\_3\}}$, and $rk\_\{3\}=g^{\{x\_1 \cdot x\_2\}}$, respectively. The service provider devices 60-i then transmit the proxy keys rk_i to the proxy devices 30-i (step RKGEN2).

Figure 14:
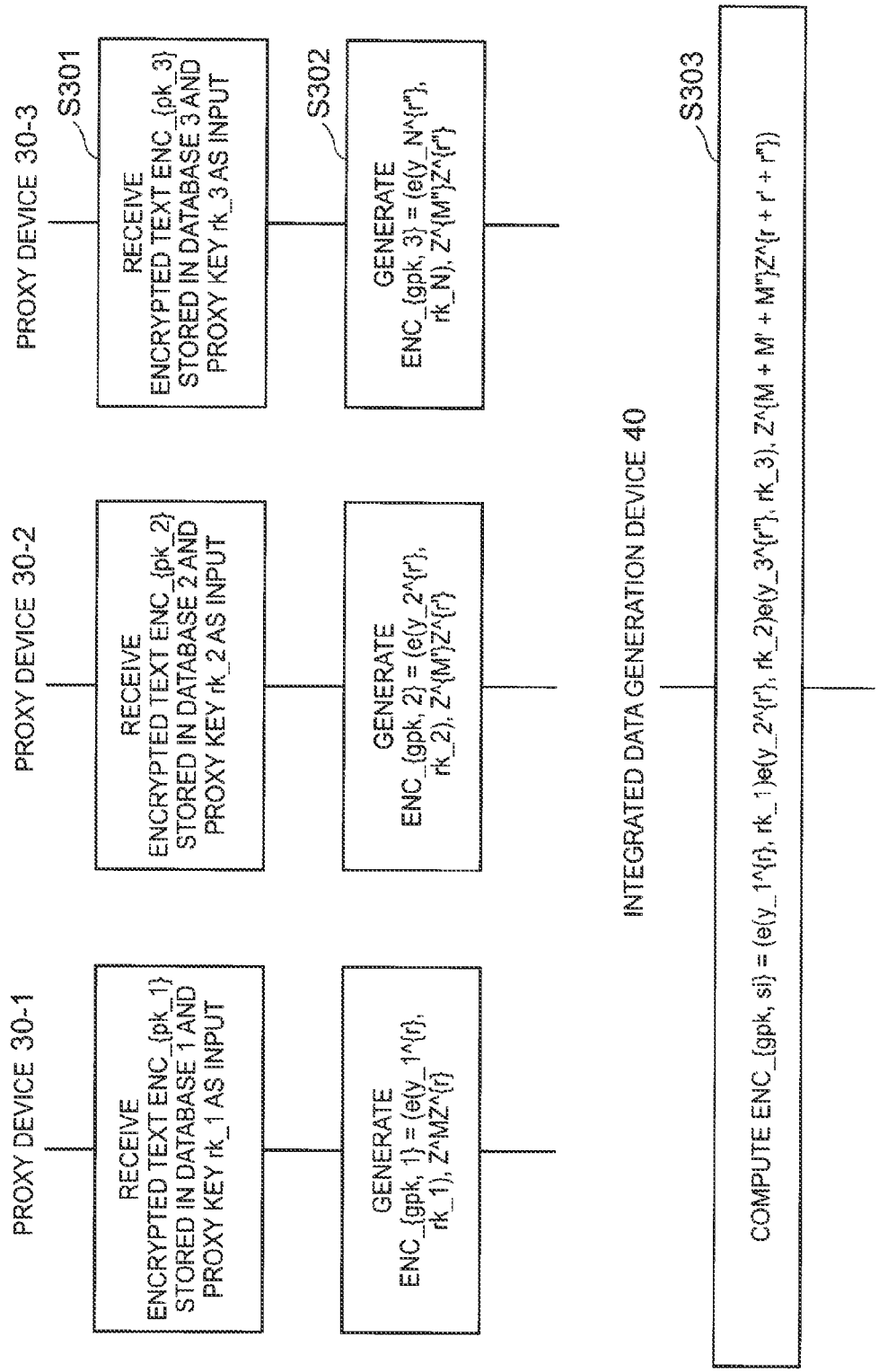
FIG. 14 It depicts a flowchart showing an example of the statistical information computation process.

Next, the statistical information computation process will be described. FIG. 14 is a flowchart showing an example of the statistical information computation process.

As shown in FIG. 14, the proxy devices 30-i receive the proxy keys rk_i and sets of encrypted text {E(pk_i, M)} stored in databases i as an input (step S301).

Here, M_i is a symbol representative of a computation result that is obtained when the sum of all pieces of plain text in the sets of encrypted text {E(pk_1, M)} stored in the databases i is computed. Further, R_i is a symbol representative of a computation result that is obtained when the sum of random numbers used to generate the sets of encrypted text {E(pk_1, M)} stored in the databases i is computed.

First of all, upon input of the sets of encrypted text {E(pk_i, M)} stored in the databases i, the proxy devices 30-i compute the sum of plain text without decrypting the encrypted text.

More specifically, when $\{E(pk\_i, M)\}=\{(C\_1, C\_2), (C\_3, C\_4)\}$, $(C\_1, C\_2)=(y\_i^{\{r\_1\}}, Z^{\{M\_1\}} \cdot Z^{\{r\_1\}})$, and $(C\_3, C\_4)=(y\_i^\{r\_2\}, Z^\{M\_2\}\cdot Z^\{r\_2\})$, $(C\_5, C\_6)= (C\_1\cdot C\_3, C\_2\cdot C\_4)=(y\_i^\{r\_1+r\_2\}, Z^\{M\_1+M\_2\}\cdot Z^\{r\_1+r\_2\})$ is computed.

Next, the proxy devices 30-$i$ perform re-encryption by the method described in Reference A upon input of $(C\_5, C\_6)$ and the proxy keys rk_i. More specifically, $(C'\_5, C'\_6)=(e (C\_5, rk\_i), C\_6)=(Z^\{x\_1x\_2x\_3\cdot R\_i\}, Z^\{M\_i\}\cdot Z^\{R\_i\})$ is computed. The proxy devices 30-$i$ then transmit the result of the computation (i.e., encrypted portion statistical data) to the integrated data generation device 40 (step S302).

Next, the integrated data generation device 40 receives the encrypted portion statistical data E(gpk, M_1) to E(gpk, M_3) from the proxy devices 30-1 to 30-3. Here, it is assumed for explanation purposes that E(gpk, M_1)=(c_1, c_2), and that E(gpk, M_2)=(c_3, c_4), and further that E(gpk, M_3)=(c_5, c_6).

The integrated data generation device 40 computes $E(gpk, si)=(c\_1\cdot c\_3\cdot c\_5, c\_2\cdot c\_4\cdot c\_6)=(Z^\{x\_1x\_2x\_3(R\_1+R\_2+R\_3)\}, Z^\{M\_1+M\_2+M\_3\}\cdot Z^\{R\_1+R\_2+R\_3\})$ (step S303). Here, si is a symbol representative of the sum of M_1, M_2, and M_3. Subsequently, the integrated data generation device 40 transmits E(gpk, si) to the integrated data storage device 50.

Figure 15:
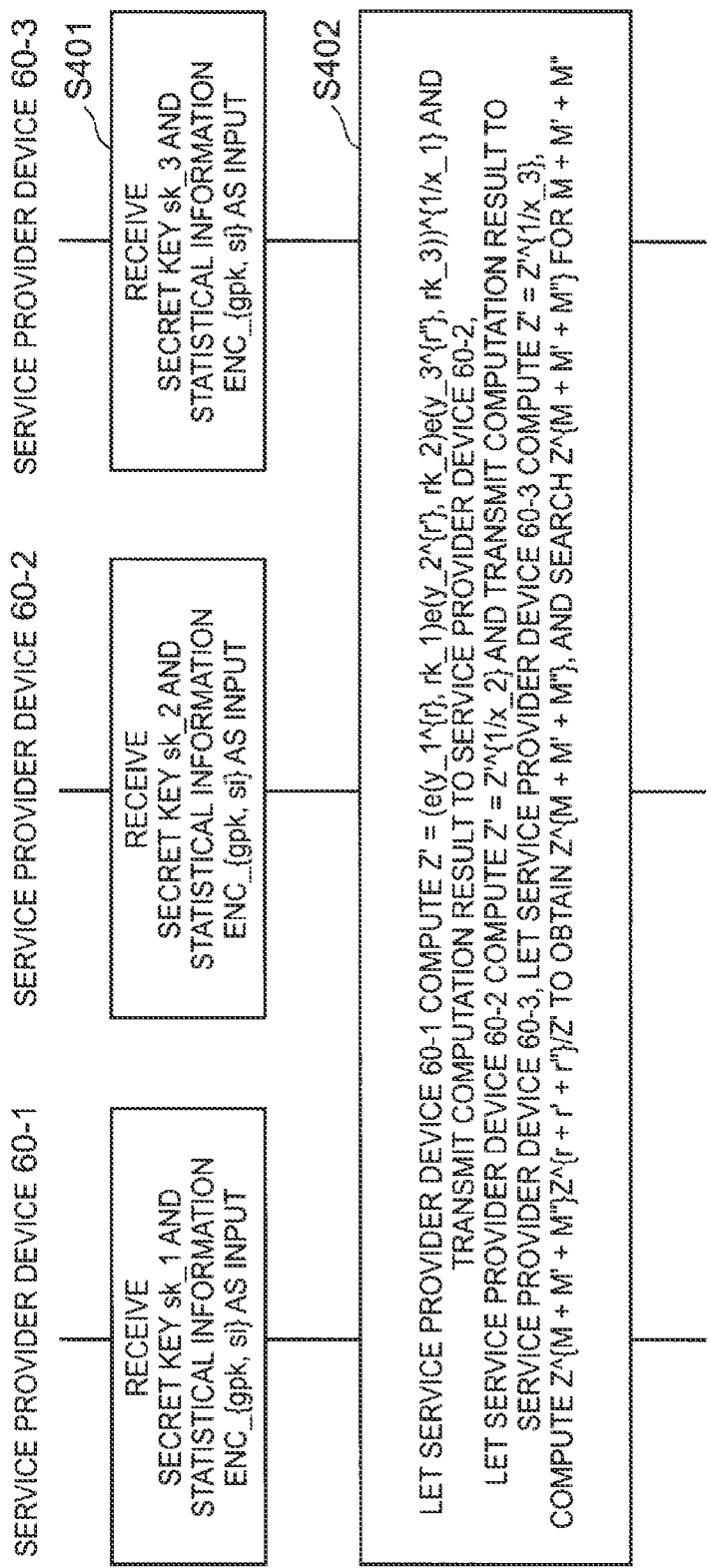
FIG. 15 It depicts a flowchart showing an example of the decryption process.

Next, the decryption process will be described. FIG. 15 is a flowchart showing an example of the decryption process.

As shown in FIG. 15, the service provider devices 60-1 to 60-3 receive the secret key sk_1 and encrypted statistical data E(gpk, si)=(C_1, C_2), the secret key sk_2 and encrypted statistical data E(gpk, si), and the secret key sk_3 and encrypted statistical data E(gpk, si), respectively (step S401).

Next, the service provider devices 60-1 to 60-3, in the order named, perform the following process (step S402).

The service provider device 60-1 computes $(C'\_1, C'\_2)=(C\_1^\{1/x\_1\}=Z^\{x\_2x\_3(R\_1+R\_2+R\_3)\}, C\_2)$ and transmits the result of the computation to the service provider device 60-2.

Next, the service provider device 60-2 computes $(C''\_1, C''\_2)=(C'\_1^\{1/x\_2\}=Z^\{x\_3(R\_1+R\_2+R\_3)\}, C'\_2)$ and transmits the result of the computation to the service provider device 60-3.

Next, the service provider device 60-3 computes $(C'''\_1, C'''\_2)=(C''\_1^\{1/x\_3\}=Z^\{(R\_1+R\_2+R\_3)\}, C''\_2)$.

Next, the service provider devices 60-$i$ compute $C'''\_2/C'''\_1=Z^\{M\_1+M\_2+M\_3\}$. Subsequently, the service provider devices 60-$i$ search $Z^\{M\_1+M\_2+M\_3\}$ for M_1+M_2+M_3 (i.e., decryption result).

As described above, the present exemplary embodiment interactively generates the global public key by using the public keys and secret keys of a plurality of servers, and generates individual proxy keys in accordance with the generated global public key and with the secret keys. The present exemplary embodiment then generates the encrypted statistical data from the proxy keys and the data encrypted by the public keys. Therefore, the present exemplary embodiment can perform statistical processing on data encrypted by different public keys while the data is left encrypted.

In the present exemplary embodiment, upon input of the sets of encrypted text {E(pk_i, M)} stored in the databases i, the proxy devices 30-$i$ compute the sum of plain text without decrypting the encrypted text. Alternatively, however, this process may be performed by a different device. Further, the encrypted text derived from this process may be pre-included in the databases i.

For example, each time the encrypted data is registered in a database by the data registration device, a process for computing the sum of plain text may be performed in the database without decrypting the encrypted data. Further, although the present exemplary embodiment uses the proxy re-encryption method described in Reference A as an example, another proxy re-encryption method may be used. For example, the ElGamal method or the elliptic ElGamal method may be used.

Furthermore, the whole encrypted data may be re-encrypted to let the integrated data generation device 40 compute the sum of plain text without decrypting the re-encrypted data instead of inputting the sets of encrypted text {E(pk_i, M)} stored in the databases i and computing the sum of plain text without decrypting the encrypted text.

Moreover, the present exemplary embodiment has been described on the assumption that each database stores a set of data encrypted by one public key. However, an alternative, for example, is to use one database to store data encrypted by different public keys.

Besides, the present exemplary embodiment has been described on the assumption that the computation of gpk and the process of decrypting the encrypted statistical data are performed by a plurality of service provider devices communicating with each other. Alternatively, however, another multi-party computation method may be used.

In the present exemplary embodiment, the proxy device 30-1 retains the proxy key $rk\_1=g^\{x\_2\cdot x\_3\}$. Even if x_1 and x_2 are additionally known, it can be mathematically proved that x_3 cannot be determined. Further, to decrypt the encrypted statistical data, all the keys x_1, x_2, and x_3 are required. Therefore, even if the administrator of the proxy device has malicious intent and colludes with N−1 service providers out of N service providers, decryption cannot be achieved unless the secret key of the remaining one service provider is leaked.

As described above, the present invention relates to an encrypted statistical processing system that can be applied to a plurality of servers. Particularly, the present invention relates to an encrypted statistical processing system that performs statistical processing on data encrypted by different public keys without decrypting the encrypted data. Further, the present invention is not limited to the above-described exemplary embodiment, but extends to various modifications that nevertheless fall within the scope of the technological idea of the present invention.

Figure 16:
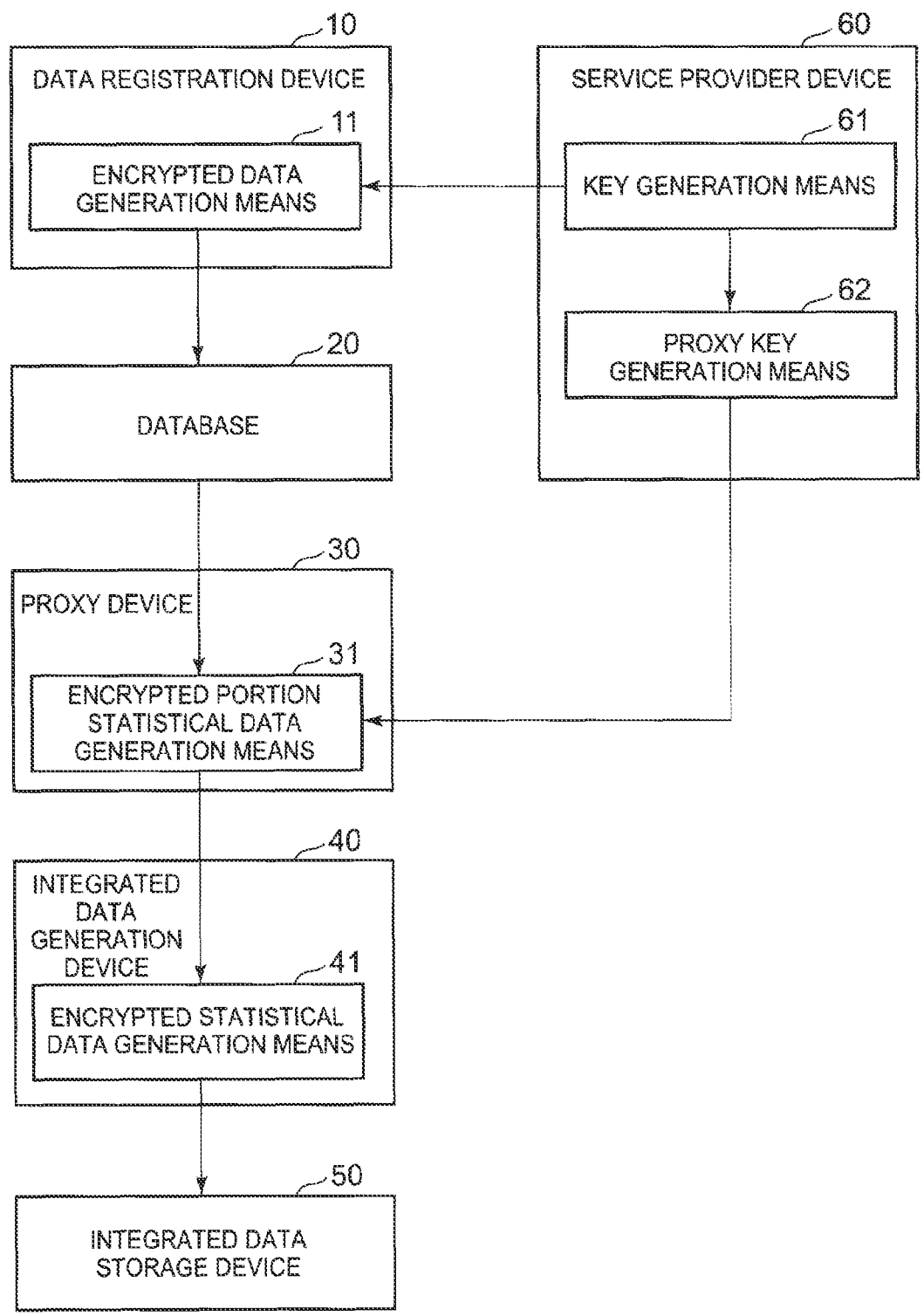
FIG. 16 It depicts a block diagram showing an exemplary minimum configuration of the encrypted statistical processing system.

A minimum configuration of the encrypted statistical processing system according to the present invention will now be described. FIG. 16 is a block diagram illustrating an exemplary minimum configuration of the encrypted statistical processing system. As shown in FIG. 16, the encrypted statistical processing system includes, as the elements of the minimum configuration, a plurality of service provider devices 60, a data registration device 10, a database 20, a plurality of proxy devices 30, an integrated data generation device 40, and an integrated data storage device 50.

The service provider devices 60 each include key generation means 61 and proxy key generation means 62. The key generation means 61 generates a service public key for encrypting data and a secret key corresponding to the service public key. The data registration device 10 includes encrypted data generation means 11, which generates encrypted data upon input of the service public key and predetermined data and stores the encrypted data in the database. The proxy devices 30 each include encrypted portion statistical data generation means 31. The integrated data generation device 40 includes encrypted statistical data generation means 41.

In the encrypted statistical processing system having the minimum configuration shown in FIG. 16, the proxy key generation means 62 generates the proxy key upon input of the service public key and secret key. Next, the encrypted portion statistical data generation means 31 generates encrypted portion statistical data with respect to the encrypted data stored in the database 20 upon input of the proxy key generated by the proxy key generation means 62. Next, the encrypted statistical data generation means 41 inputs the encrypted portion statistical data from each proxy device 30 and generates encrypted statistical data.

Consequently, the encrypted statistical processing system having the minimum configuration can perform statistical processing on data encrypted by different public keys without decrypting the encrypted data.

The present exemplary embodiment represents characteristic configurations of the encrypted statistical processing system as described in the following (1) to (5).

(1) The encrypted statistical processing system includes a plurality of service provider devices (e.g., service provider device 60-1), a data registration device (e.g., data registration device 10), a database (e.g., database 20), a plurality of proxy devices (e.g., proxy device 30-1), an integrated data generation device (e.g., integrated data generation device 40), and an integrated data storage device (e.g., integrated data storage device 50). The service provider devices each include key generation means (e.g., key generation section 60-$i$-1), which generates a service public key for encrypting data and a secret key corresponding to the service public key, and proxy key generation means (proxy key generation section 60-$i$-3), which generates a proxy key upon input of the service public key and the secret key. The data registration device includes encrypted data generation means (e.g., means implemented by an encrypted data generation section 10-1), which generates encrypted data upon input of the service public key and predetermined data. The database stores the encrypted data. The proxy devices each include encrypted portion statistical data generation means (e.g., means implemented by an encrypted data conversion section 30-$i$-1), which generates encrypted portion statistical data upon input of the proxy key generated by the proxy key generation means with respect to the encrypted data stored in the database. The integrated data generation device includes encrypted statistical data generation means (e.g., means implemented by an integrated data generation section 40-1), which inputs the encrypted portion statistical data from each of the proxy devices and generates encrypted statistical data. The integrated data storage device stores the encrypted statistical data.

(2) In the encrypted statistical processing system, the proxy key generation means may generate a proxy key corresponding to the secret key of each of the service provider devices by allowing each of the service provider devices to input its secret key and communicating with each of the service provider devices.

(3) In the encrypted statistical processing system, the service provider devices may each include statistical information generation means (e.g., means implemented by a partial decryption section 60-$i$-4), which inputs the encrypted statistical data stored in the integrated data storage device and the secret key of each of the service provider devices and communicates with the other service provider devices to decrypt the encrypted statistical data and generate statistical information.

(4) In the encrypted statistical processing system, when the number of databases storing the encrypted data is 1 or greater integer N, $a\_i$ is the secret key of a service $i$, and $y\_i = g^{\{a\_i\}}$ is the public key in a situation where groups G and G_T have a prime order q, e( ) is a pairing function that is a map for group G_T when two members of G are input, g is a generator of group G, and q, e, g, and $Z=e(g, g)$ are system parameters, the proxy key generation means may generate a proxy key including $g^{\{a\_1 a\_2 \ldots a\_N / a\_i\}}$ as a proxy key rk_$i$ corresponding to the service $i$.

(5) In the encrypted statistical processing system, the encrypted data generation means may generate encrypted data including $(y\_i^r, M \cdot Z^r)$ as the encrypted data corresponding to the service $i$ when a message is M and a random number of 1 or greater but smaller than q is r, and the encrypted statistical data generation means may generate encrypted statistical data including $(e(gpk, g)^R, S \cdot Z^R)$ when the sum of random numbers used to generate encrypted data targeted for statistical information computation is R, $gpk = g^{\{a\_1 a\_2 \ldots a\_N\}}$, and the statistical information is S.

While the present invention has been described in terms of an exemplary embodiment, it should be understood that the present invention is not limited to such an exemplary embodiment. Persons skilled in the art will appreciate that the configuration and details of the present invention can be modified in various manners without departing from the scope and spirit of the present invention.

This application is based upon and claims the benefit of priority from Japanese Patent Application No. 2011-130489, filed on Jun. 10, 2011, the disclosure of which is incorporated herein in its entirety by reference.

INDUSTRIAL APPLICABILITY

The present invention is suitably applicable to statistical processing that is performed through a communications network on data encrypted by different public keys to determine a statistical value without decrypting the encrypted data.

REFERENCE SIGNS LIST

10 Data registration device
10-1 Encrypted data generation section
10-2 Encrypted data registration request section
11 Encrypted data generation means
30-$i$ Proxy device
30-$i$-1 Encrypted data conversion section
31 Encrypted portion statistical data generation means
40 Integrated data generation device
40-1 Integrated data generation section
41 Encrypted statistical data generation means
50 Integrated data storage device
60-$i$ Service provider device
60-$i$-1 Key generation section
60-$i$-2 Integration key generation section
60-$i$-3 Proxy key generation section
60-$i$-4 Partial decryption section
61 Key generation means
62 Proxy key generation means

The invention claimed is:
1. An encrypted statistical processing system comprising:
a plurality of service provider devices;
a data registration device;
a plurality of databases;
a plurality of proxy devices;
an integrated data generation device; and
an integrated data storage device;

wherein the service provider devices each include
a processor,
a key generation unit, implemented by the processor, which generates a service public key for encrypting data and a secret key corresponding to the service public key according to a program,
a proxy key generation unit, implemented by the processor, which generates a proxy key, for generating encrypted portion statistical data from the encrypted data stored in a corresponding one of the databases, upon input of the service public key and the secret key according to the program, and
an integration key generation unit, implemented by the processor, which generates a global public key for generating the proxy key by using the public keys and secrets keys of all the service provider devices, while generated global public key is sequentially transmitted among the service provider devices;
wherein the data registration device includes an encrypted data generation unit, implemented by a processor, which generates the encrypted data upon input of the service public key and predetermined data and registers the encrypted data to each of the databases corresponding to the service provider device releasing the service public key;
wherein each of the database stores the encrypted data;
wherein each of the proxy devices includes an encrypted portion statistical data generation unit, implemented by a processor, which generates the encrypted portion statistical data upon input of the proxy key generated by the proxy key generation unit with respect to the encrypted data stored in a corresponding one of the databases according to a program;
wherein the integrated data generation device includes an encrypted statistical data generation unit, implemented by a processor, which inputs the encrypted portion statistical data from each of the proxy devices and generates encrypted statistical data derived from statistical processing that is performed in accordance with the encrypted portion statistical data according to a program;
wherein the integrated data storage device stores the encrypted statistical data;
wherein, when the number of databases storing the encrypted data is 1 or greater integer N, $a\_i$ is the secret key of a service $y\_i=g^{\{a\_i\}}$ is the public key in a situation where groups G and G_T have a prime order q, e( ) is a pairing function that is a map for group G_T when two members of G are input, g is a generator of group G, and q, e, g, and $Z = e(g, g)$ are system parameters, the proxy key generation unit generates a the proxy key including $g^{\{a\_1 a\_2 \ldots a\_N/a\_i\}}$ as the proxy key rk_i corresponding to the service i;
wherein the proxy key generation unit generates the proxy key corresponding to the secret key of each of the service provider devices, on the basis of the global public key and the secret key, by allowing each of the service provider devices to input the secret key thereof and communicating with each of the service provider devices; and
wherein the service provider devices each include a statistical information generation unit, implemented by the processor, which inputs the encrypted statistical data stored in the integrated data storage device and the secret key of each of the service provider devices, communicates with the other service provider devices to decrypt the encrypted statistical data and generate statistical information according to a program.

2. The encrypted statistical processing system according to claim 1, wherein the encrypted data generation unit generates encrypted data including $(y\_i^r, M \cdot Z^r)$ as the encrypted data corresponding to the service i when a message is M and a random number of 1 or greater but smaller than q is r; and wherein the encrypted statistical data generation unit generates encrypted statistical data including $(e(gpk, g)^R, S \cdot Z^R)$ when the sum of random numbers used to generate encrypted data targeted for statistical information computation is R, $gpk=g^{\{a\_1 a\_2 \ldots a\_N\}}$, and the statistical information is S.

3. An encrypted statistical processing device comprising:
a plurality of key generation units, each implemented by a processor in each service provider device, each of which generates a service public key, for generating encrypted portion statistical data from encrypted data stored in a corresponding one of databases, for encrypting data and a secret key corresponding to the service public key according to a program;
a plurality of proxy key generation units, each implemented by the processor in each service provider device, which generates a proxy key, for generating encrypted portion statistical data from the encrypted data stored in a corresponding one of the databases, upon input of the service public key and the secret key according to the program;
a plurality of integration key generation units, each implemented by the processor in each service provider device, which generates a global public key for generating the proxy key by using the public keys and secrets keys of all the service provider devices, while generated global public key is sequentially transmitted among the service provider devices;
an encrypted data generation unit, implemented by the processor in each service provider device, which generates the encrypted data upon input of the service public key and predetermined data and registers the encrypted data to each of the databases corresponding to the service provider device releasing the service public key according to the program;
a plurality of encrypted portion statistical data generation units, each implemented by a second processor, each of which generates the encrypted portion statistical data with respect to the encrypted data upon input of the proxy key generated by the proxy key generation unit with respect to the encrypted data stored in a corresponding one of the databases according to the program; and
an encrypted statistical data generation unit, implemented by a third processor, which inputs the encrypted portion statistical data from each of the encrypted portion statistical data generation units and generates the encrypted statistical data derived from statistical processing that is performed in accordance with the encrypted portion statistical data according to the program,
wherein, when the number of databases storing the encrypted data is 1 or greater integer N, $a\_i$ is the secret key of a service i, and $y\_i=g^{\{a\_i\}}$ is the public key in a situation where groups G and G_T have a prime order q, e( ) is a pairing function that is a map for group G_T when two members of G are input, g is a generator of group G, and q, e, g, and $Z = e(g, g)$ are system parameters, the proxy key generation unit generates the proxy key including $g^{\{a\_1 a\_2 \ldots a\_N/a\_i\}}$ as the proxy key rk_i corresponding to the service i, and wherein the proxy key generation unit generates the proxy key corresponding to the secret key of each of the service provider devices, on the basis of the global public key and the secret key, by allowing each of the service provider devices to input the secret key thereof and communicating with each of the service provider devices;

the encrypted statistical processing device further comprising a plurality of statistical information generation unit, implemented by the processor in each service provider device, which inputs the encrypted statistical data stored in a integrated data storage device and the secret key of each of the service provider devices, communicates with the other service provider devices to decrypt the encrypted statistical data and generate statistical information according to a program.

4. The encrypted statistical processing device according to claim 3, wherein the encrypted data generation unit generates encrypted data including $(y\_i^r, M \cdot Z^r)$ as the encrypted data corresponding to the service i when a message is M and a random number of 1 or greater but smaller than q is r; and wherein the encrypted statistical data generation unit generates encrypted statistical data including $(e(gpk, g)^R, S \cdot Z^R)$ when the sum of random numbers used to generate encrypted data targeted for statistical information computation is R, $gpk=g^{\{a\_1 a\_2 \ldots a\_N\}}$, and the statistical information is S.

5. The encrypted statistical processing device according to claim 3, further comprising an integration key generation unit, implemented by the processor, which generates a global public key for generating the proxy key by using the public keys and secrets keys of a plurality of the services, and wherein the proxy key generation unit generates proxy keys in accordance with the generated global public key and with the secret keys.

6. An encrypted statistical processing method, implemented by a processor according to a program, comprising:

generating a service public key for encrypting data and a secret key corresponding to the service public key for each of service provider devices;

generating a proxy key upon input of the service public key and the secret key for each of the service provider devices;

generating a global public key for generating the proxy key by using the public keys and secrets keys of all the service provider devices, while generated global public key is sequentially transmitted among the service provider devices;

generating the encrypted data upon input of the service public key and predetermined data and registers the encrypted data to each of databases corresponding to the service provider device releasing the service public key;

generating encrypted portion statistical data upon input of the generated proxy key with respect to encrypted data stored in a corresponding one of the databases; and generating encrypted statistical data derived from statistical processing that is performed in accordance with the encrypted portion statistical data, wherein, when the number of databases storing the encrypted data is 1 or greater integer N, a_i is the secret key of a service i, and $y\_i=g^{\{a\_i\}}$ is the public key in a situation where groups G and G_T have a prime order q, e( ) is a pairing function that is a map for group G_T when two members of G are input, g is a generator of group G, and q, e, g, and $Z = e(g, g)$ are system parameters, the proxy key including $g^{\{a\_1 a\_2 \ldots a\_N/a\_i\}}$ as the proxy key rk_i corresponding to the service i is generated; and wherein the proxy key corresponding to the secret key of each of the service provider devices is generated, on the basis of the global public key and the secret key, by allowing each of the service provider devices to input the secret key thereof and communicating with each of the service provider devices;

wherein the encrypted statistical data stored in a integrated data storage device and the secret key of each of the service provider devices are inputted, the encrypted statistical data is decrypted by communicating with the other service provider devices and statistical information is generated.

* * * * *